(12) United States Patent
Kwong

(10) Patent No.: US 12,025,535 B2
(45) Date of Patent: Jul. 2, 2024

(54) PNEUMATIC LEAK DETECTOR WITH IMPROVED NOZZLE

(71) Applicant: Evan Kwong, Monterey Park, CA (US)

(72) Inventor: Evan Kwong, Monterey Park, CA (US)

( * ) Notice: Subject to any disclaimer, the term of this patent is extended or adjusted under 35 U.S.C. 154(b) by 0 days.

(21) Appl. No.: 17/964,429

(22) Filed: Oct. 12, 2022

(65) Prior Publication Data

US 2023/0033653 A1 Feb. 2, 2023

(51) Int. Cl.
*G01M 3/20* (2006.01)
*G01M 3/22* (2006.01)

(52) U.S. Cl.
CPC .................. *G01M 3/222* (2013.01)

(58) Field of Classification Search
CPC .............................................. G01M 3/20–229
See application file for complete search history.

(56) References Cited

U.S. PATENT DOCUMENTS

| 6,907,771 B2 * | 6/2005 | Finlay | G01M 3/025 |
| | | | 73/40.7 |
| 2012/0201522 A1 * | 8/2012 | Stauffer | A63J 5/025 |
| | | | 392/386 |
| 2014/0069174 A1 * | 3/2014 | Banyard | G01M 3/20 |
| | | | 392/397 |

OTHER PUBLICATIONS sprayingnozzles.eu, "CP01—Flat Fan Spray Nozzles", https://sprayingnozzles.eu/buy/flat-fan-high-pressure-spray-nozzles-cp01/ (accessed and archived Mar. 24, 2022).

* cited by examiner

*Primary Examiner* — Alexander A Mercado
(74) *Attorney, Agent, or Firm* — The Law Office of Scot S. Fagerland, PC

(57) ABSTRACT

A pneumatic leak detector operates by submerging a nozzle in oil. Airflow from the nozzle results in simultaneous cavitation and atomization of the oil. Microscopic oil droplets form a fog, which is used to detect leaks in closed duct systems. The integrated valve and nozzle includes a stem on one end for air input, the nozzle on the other end for air output, and a check valve between the stem and the nozzle to prevent the backflow of air or oil. The exterior body of the integrated valve and nozzle is a convex body wedge. A smaller concave wedge is cut at the orifice of the nozzle. The critical parameters of the nozzle are its orifice diameter, body wedge angle, orifice cut angle, and orifice cut depth, all of which have been optimized by experimentation to yield maximal fog density.

13 Claims, 5 Drawing Sheets

PNEUMATIC LEAK DETECTOR WITH IMPROVED NOZZLE

1. FIELD OF THE INVENTION

This invention is in the field of airflow valves and nozzles, specifically for atomizing fluid into fog.

2. BACKGROUND OF THE INVENTION

A leak detector is a device for detecting leaks in closed duct systems such as HVAC ducts or automotive engines, intakes, exhaust pipes, gas tanks, or evaporative emission control systems. A leak detector produces smoke or fog. The smoke or fog is channeled into a closed system. If the system has any leaks, the smoke or fog will emerge from the leak points for easy visual identification.

This invention is a leak detector that produces fog for detecting leaks, ideally in automotive systems.

3. DESCRIPTION OF RELATED TECHNOLOGY

Traditional automotive smoke machines heat mineral oil to the smoke point temperature. At this temperature, the liquid mineral oil is atomized into particulate smoke. This method requires a high amount of energy, most of which is lost as heat. In addition, the output smoke is highly carcinogenic due to the oxidation of mineral oil caused by overheating. The smoke is extremely uncomfortable to breathe. Directly breathing the output smoke can cause eye, nose, and lung irritation.

U.S. Pat. No. 6,907,771 (Finlay and Clumpus) describes a leak detector that produces fog by directing pressurized air at the surface of a fluid. The pressurized air emerges from a nozzle suspended a small distance above the fluid. This pneumatic technology eliminates the problems associated with energy consumption, waste heat, and carcinogenic smoke.

4. SUMMARY OF THE INVENTION

The present invention is a pneumatic leak detector with an improved nozzle. The nozzle is designed to operate while submerged in fluid (ideally oil), rather than being suspended above the fluid. It produces fog by forcing air through a special orifice. The nozzle geometry maximizes fog density by minimizing particle size. A check valve prevents backflow of air or fluid into the air source.

Figure 1:
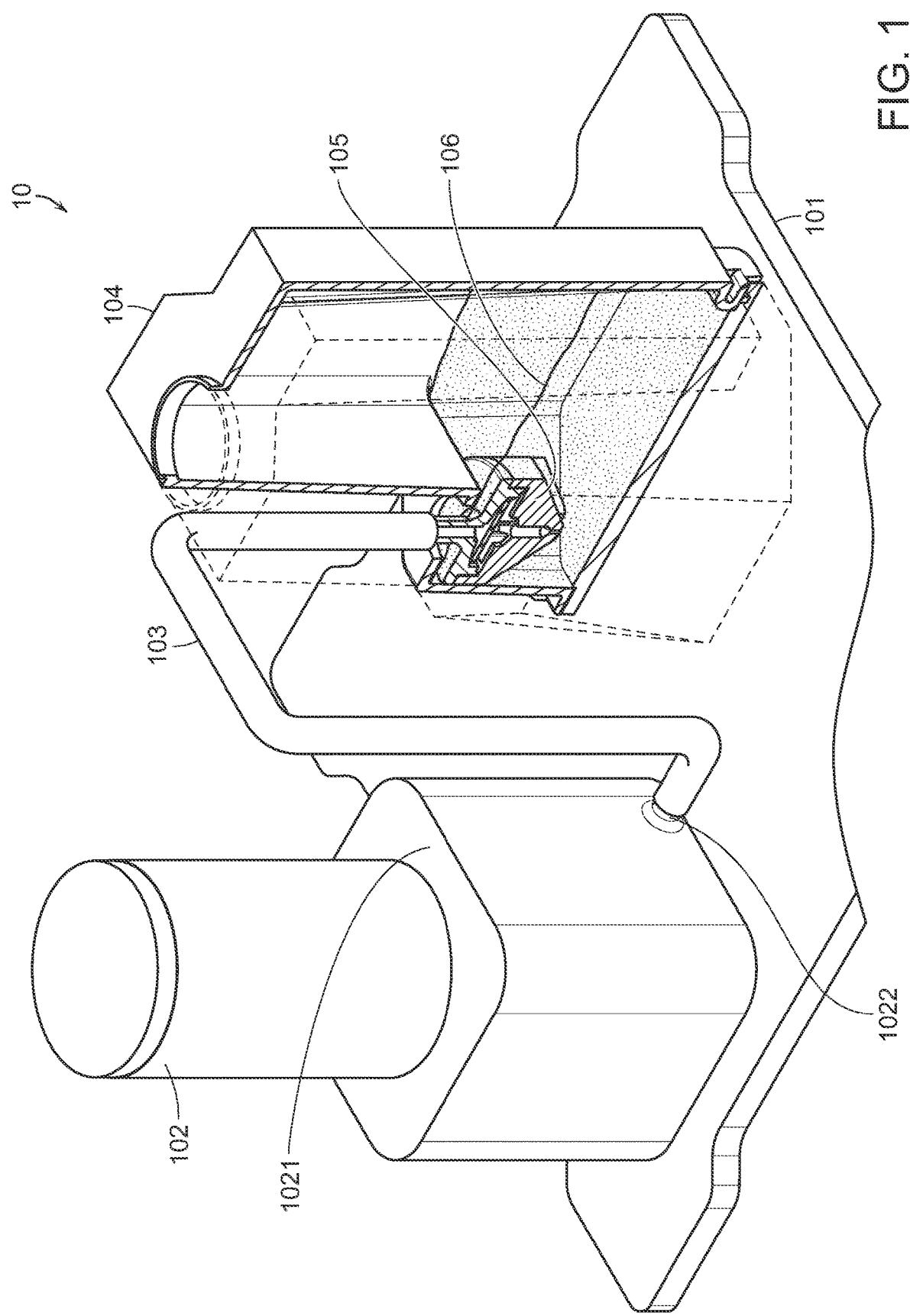
Figure 2:
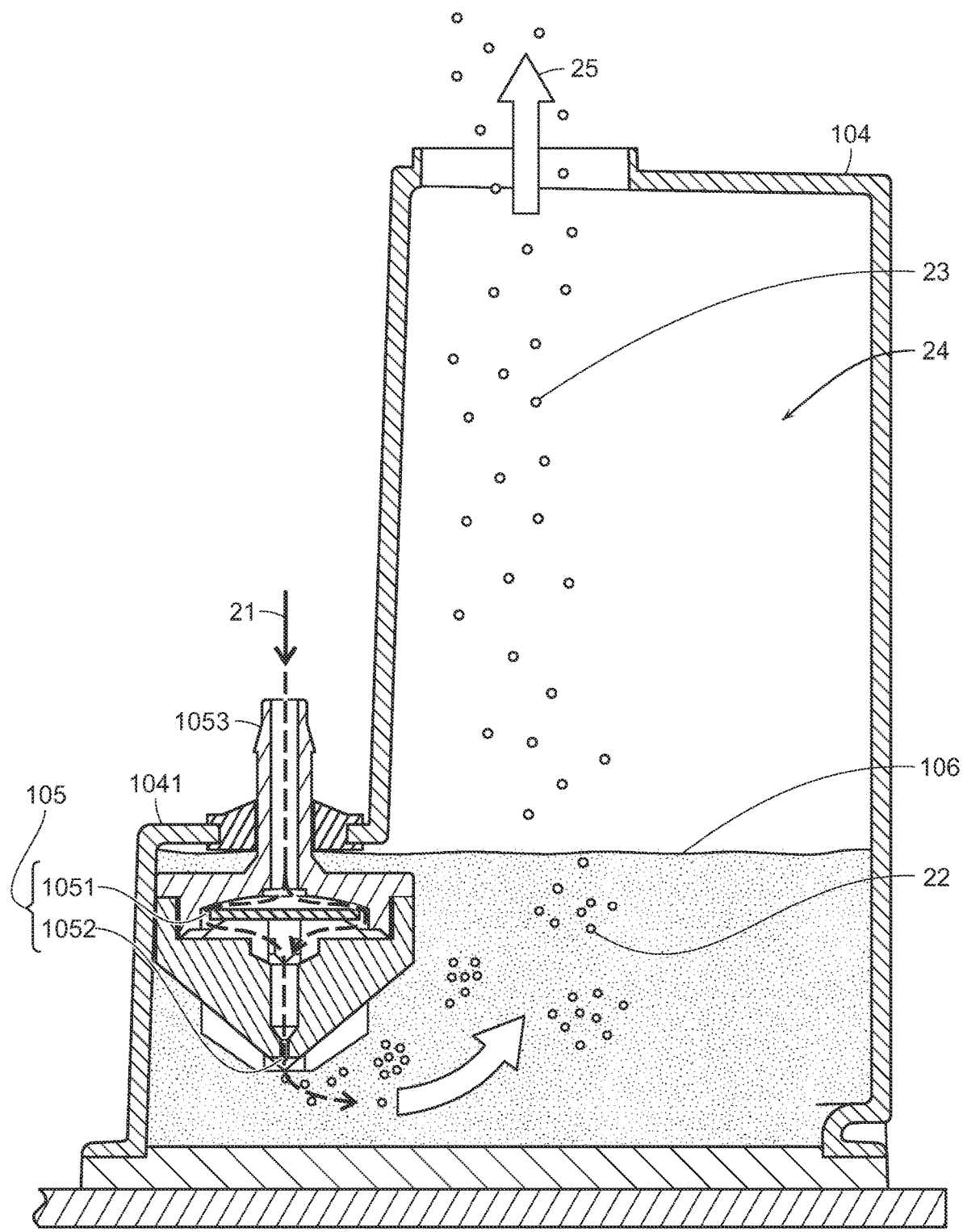
Figure 3:
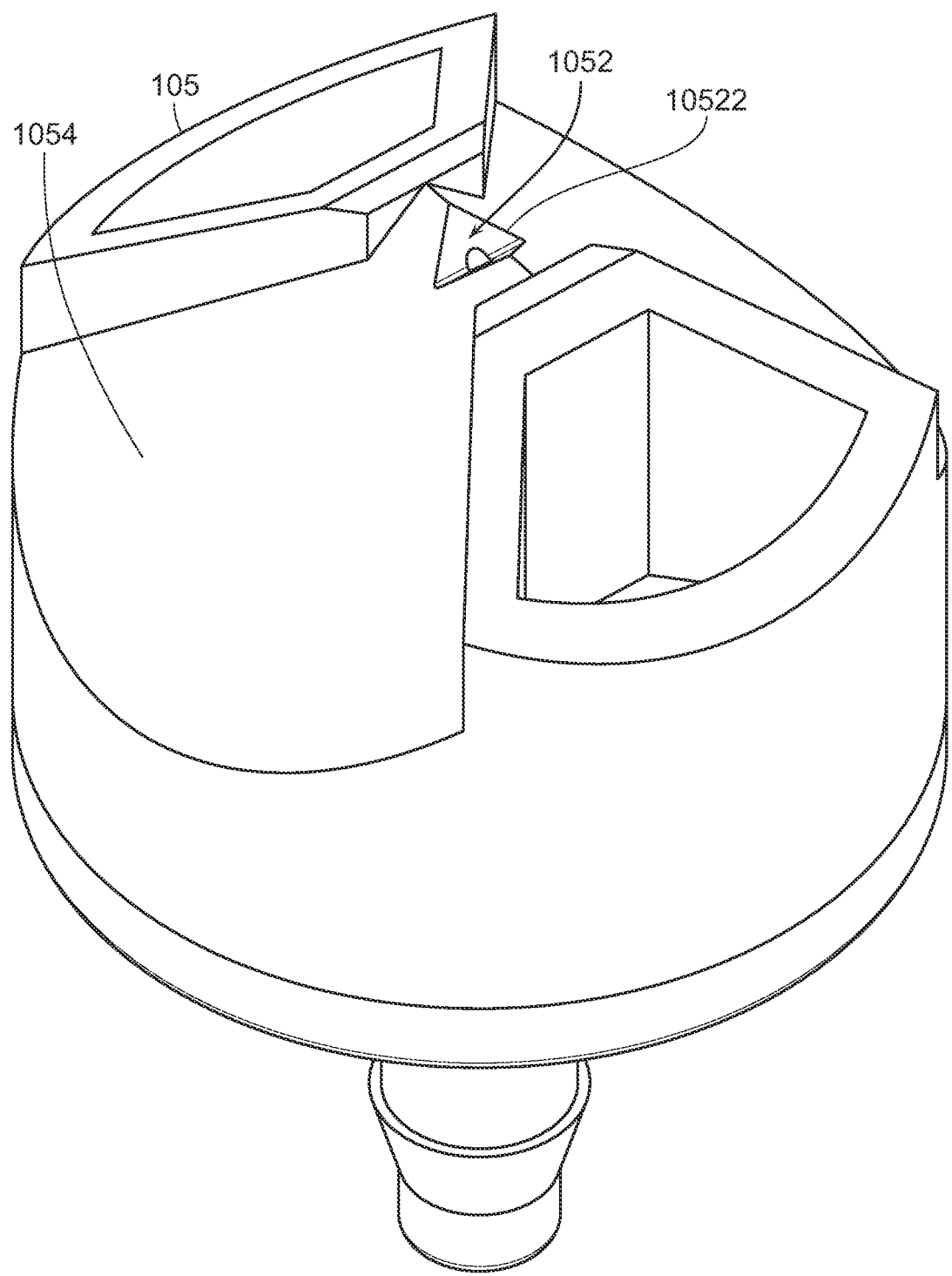
Figure 4:
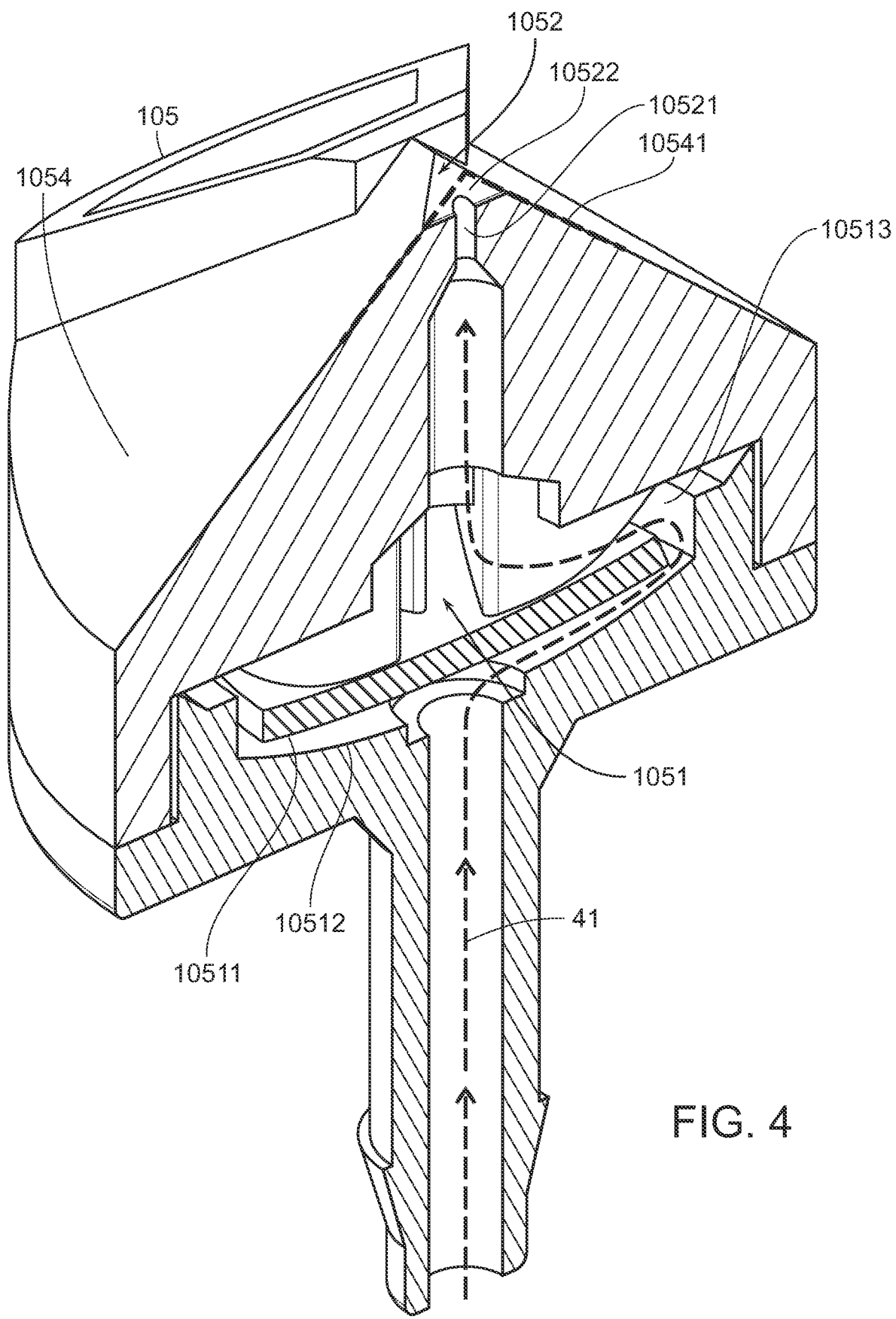
Figure 5:
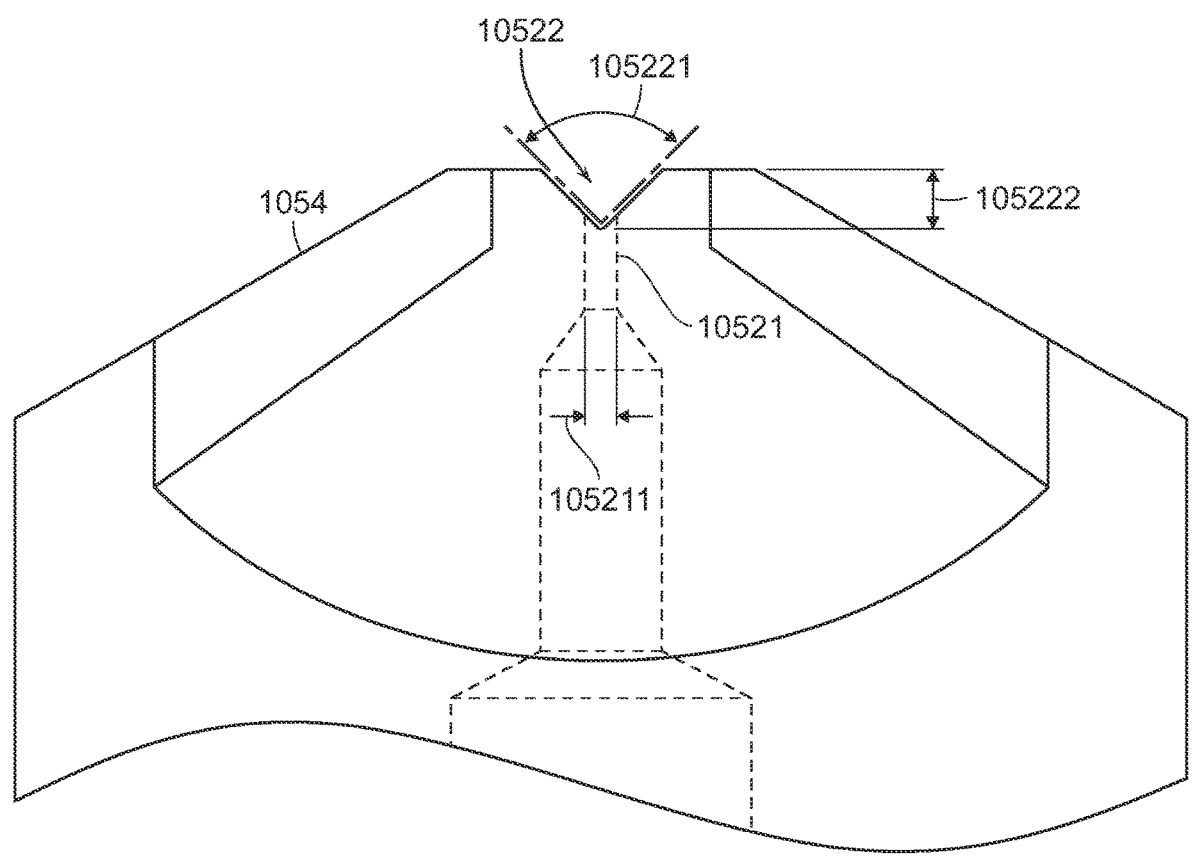

As pressurized air exits the nozzle and contacts the fluid, it forms bubbles that float up to the surface of the fluid. Simultaneously, the nozzle atomizes the oil into tiny particles, like a garden sprinkler. The atomized oil ("fog") is trapped inside the bubbles. Thus, when the bubbles reach the surface of the oil and burst, they release fog into the fluid chamber. The fog accumulates pressure so that it is automatically forced out of the output of the fluid chamber.

5. BRIEF DESCRIPTION OF THE DRAWINGS

FIG. 1 shows the components of the pneumatic leak detector in a perspective view.

FIG. 2 is a cross-sectional view of the nozzle assembly operating within a fluid chamber.

FIG. 3 is an external view of the nozzle assembly in isolation.

FIG. 4 is a detailed cutaway view of the nozzle assembly.

FIG. 5 is a detailed cross-sectional view of the distal end of the nozzle.

6. DETAILED DESCRIPTION OF THE PREFERRED EMBODIMENTS

FIG. 1 presents the major components of a pneumatic leak detector 10. The system is mounted on a base mounting plate 101. A DC electric air pump 102 takes in atmospheric air through the air pump input 1021, pressurizes the air, and expels the pressurized air through the air pump output 1022. The air pump is driven by a power source such as a battery or a generator. The pressurized air is directed through conduit 103, which passes into fluid chamber 104. The fluid chamber is partially filled with fluid 106, which is ideally an oil. The conduit is connected to the nozzle assembly 105, which is partially or entirely submerged in the fluid 106. The entire leak detector 10 is ideally contained within a housing.

The air pump can be used for additional purposes such as pressure and flow testing. Therefore, a solenoid valve can be added between the air pump output and the nozzle assembly, to vary the direction of air flow. Regardless of configuration, the air from the air pump output must eventually enter into the nozzle assembly. The conduit 103 can pass through check valves, splits, fittings, or other airflow regulators between the air pump output 1022 and the nozzle assembly 105.

FIG. 2 depicts the pneumatic operations within the fluid chamber 104. The nozzle assembly 105 is positioned at the fluid chamber input 1041. Stem 1053 protrudes outside the fluid chamber, while the nozzle 1052 is situated within the fluid chamber. The level of the fluid 106 should be at least as high as the nozzle 1052, so that air exiting the invention comes into immediate contact with the fluid. A check valve 1051 may be integrated into the nozzle assembly. Alternatively, the check valve may be separate from the nozzle assembly, in which case the valve and the nozzle assembly would be connected by air tubing. Pressurized air in the air tubing conduit would progress from the air pump output to the check valve, and then from the check valve to the nozzle assembly.

Pressurized air 21 enters the nozzle assembly from the conduit 103 (omitted from FIG. 2) into stem 1053. The air passes through the check valve 1051 and exits the nozzle 1052. As the air contacts the fluid 106, cavitation and atomization occur simultaneously. Air bubbles 22 form at the mouth of the nozzle and rise to the surface of the fluid. Meanwhile, the fluid around the mouth of the nozzle is dispersed into atomized fluid particles 23 (small, but not necessarily literally atoms). The fluid particles occupy the air bubbles; as the bubbles breach the surface of the fluid and burst, the atomized fluid particles are released into the airspace 24 inside the fluid chamber. The atomized fluid particles form a fog within the airspace 24. As they accumulate, the vapor pressure of the fog increases. The vapor pressure soon exceeds atmospheric pressure, at which point fog emerges from the fluid chamber output 25. This fog is directed through an exit conduit (not shown) and then into a closed duct system as described above.

The exterior of the nozzle assembly 105 is best seen in FIG. 3, while an embodiment of its internal features is presented in FIGS. 4 and 5. The nozzle has a cylindrical bore 10521, which opens into a concave nozzle wedge 10522. The exterior of the nozzle assembly, near the nozzle wedge, is shaped as a convex body wedge 1054.

The features of the nozzle are shaped and sized to critical dimensions. The diameter of the cylindrical bore is the orifice diameter 105211, seen best in FIG. 5. The angle between the faces of the body wedge 1054 is the body wedge angle 10541, seen best in FIG. 4. The angle between the faces of the nozzle wedge 10522 is the orifice cut angle 105221, best seen in FIG. 5. The depth of the nozzle wedge is the orifice cut depth 105222, best seen in FIG. 5.

Experimentation has shown that the orifice diameter 105211 is ideally 0.51 mm, with an acceptable range of 0.30 mm to 1.20 mm. This range creates ideal airflow; airflow is too low for diameters below 0.3 mm and too high for diameters above 1.2 mm. A smaller diameter causes weak output; it is also hard to manufacture. A larger diameter results in low fog density with a small mist-to-air ratio.

The nozzle wedge 10522 is a highly critical feature; mist density can be up to 80% lower without it. Experimentation has shown that the orifice cut angle 105221 is ideally 90°, with an acceptable range of 30° to 130°. Smaller angles create challenges in manufacturing the orifice. Larger angles result in decreasingly dense fog.

The orifice cut depth 105222 is ideally 1.2 mm, with an acceptable range of 0.4 mm to 3.0 mm. A cut depth outside of this range reduces mist density by up to 40%.

The body wedge 1054 helps expose and increase the surface area of the nozzle wedge 10522. Current embodiments of the invention have proven to work best with a body wedge angle 10541 of approximately 90°, with an acceptable range of 50° to 140°.

FIG. 4 shows an embodiment of the check valve 1051. The check valve ensures that air, fog, and fluid cannot pass backward or upstream from the nozzle 1052 toward the pump 102. Nozzles and valves are both commonly manufactured items, but the known prior art has not revealed a valve integrated into a nozzle.

The check valve includes a soft rubber disc 10511 positioned in line with the internal airflow 41. Forward airflow bends the soft rubber disc in a downstream direction, thus allowing air to continue flowing downstream. The disc has room to bend in this direction due to the valve space 10513. Valve floor 10512 prevents the soft rubber disc from bending in the upstream direction. This effectively blocks fluids from flowing in reverse past the check valve.

Experimentation has shown that the quantity and quality of the vapor are optimized when the air exits the nozzle at a pressure of 3-9 PSI and a flow rate of 1-7 liters per minute.

I claim:

1. A system for detecting leaks in a conduit, comprising:

a DC electric air pump;

a check valve connected to the DC electric air pump by air tubing;

a fluid chamber;

a nozzle assembly within the fluid chamber and connected by air tubing to the check valve;

said nozzle assembly comprising an interior, an exterior, a proximal end, a stem at the proximal end, a distal end that assumes the form of a convex body wedge, and a nozzle at the distal end;

a housing to house the DC electric air pump, check valve, fluid chamber, and nozzle assembly;

an exhaust port in the housing, such that the fluid chamber opens into the exhaust port.

2. The invention of claim 1, further comprising a concave nozzle wedge cut into the nozzle.

3. The invention of claim 2, wherein the nozzle comprises an orifice with an orifice diameter;

and the orifice diameter is between 0.3 mm and 1.2 mm, inclusive.

4. The invention of claim 3, wherein the nozzle wedge opens at an angle between 30° and 130°, inclusive.

5. The invention of claim 4, wherein the nozzle wedge is cut at a depth between 0.4 mm and 3.0 mm, inclusive.

6. The invention of claim 5, wherein the body wedge is cut at an angle between 50° and 140°, inclusive.

7. The invention of claim 6, wherein the check valve is integrated into the interior of the nozzle assembly.

8. The invention of claim 7, the check valve comprising a conduit connecting the stem to the orifice in the interior of the body;

a flexible rubber disc concentric with the conduit;

a valve space distal to the flexible rubber disc, to allow air to flow in the proximal-to-distal direction around the flexible rubber disc;

and a valve floor proximal to the flexible rubber disc, to prohibit the flow of fluid in the distal-to-proximal direction around the flexible rubber disc.

9. The invention of claim 8, further comprising at least one airflow regulator in the conduit between the air pump output and the nozzle assembly.

10. The invention of claim 9, in which the at least one airflow regulator is selected from the group consisting of a solenoid valve, a split, and a fitting.

11. A method of producing vapor, comprising the steps of providing a chamber of oil with a surface;

submerging a nozzle assembly below the surface of the oil, said nozzle assembly comprising an interior, an exterior, a proximal end, a stem at the proximal end, a distal end that assumes the form of a convex body wedge, and a nozzle at the distal end;

pumping air through the nozzle to atomize the oil into vaporous particles;

and collecting the vaporous particles in the chamber above the surface of the oil.

12. The method of claim 11, in which the air is pumped through the nozzle at a pressure of 3 to 9 PSI, inclusive.

13. The method of claim 12, in which the air is pumped through the nozzle at a flow rate of 1 to 7 liters per minute, inclusive.

* * * * *